United States Patent [19]
Albrecht et al.

[11] Patent Number: 6,052,258
[45] Date of Patent: Apr. 18, 2000

[54] TRANSDUCER SUSPENSION SYSTEM

[75] Inventors: David W. Albrecht; Thomas R. Albrecht; Satya Prakash Arya; Tzong-Shii Pan; Surya Pattanaik; Victor Wing Chun Shum, all of San Jose, Calif.

[73] Assignee: International Business Machines Corporation, Armonk, N.Y.

[21] Appl. No.: 09/087,019

[22] Filed: May 29, 1998

[51] Int. Cl.[7] .............................. G11B 5/49; G11B 21/16
[52] U.S. Cl. ................................................... 360/104
[58] Field of Search ....................... 360/104; 29/603.03, 29/603.04

[56] References Cited

U.S. PATENT DOCUMENTS

| | | | |
|---|---|---|---|
| 5,550,694 | 8/1996 | Hyde | 360/104 |
| 5,557,839 | 9/1996 | Mastache et al. | 29/603.03 |
| 5,742,996 | 4/1998 | Frater et al. | 29/603.06 |
| 5,805,377 | 9/1998 | Lerdal et al. | 360/97.01 |
| 5,873,159 | 2/1999 | Arya et al. | 29/603.03 |
| 5,894,655 | 4/1999 | Symons | 29/603.03 |
| 5,920,444 | 7/1999 | Heeren et al. | 360/104 |

*Primary Examiner*—William Klimowicz
*Attorney, Agent, or Firm*—Douglas R. Millett

[57] ABSTRACT

A suspension system comprises a multiple letter flexure, a load beam and an arm. The load beam extends from the tip of the suspension all the way back to the rear of the arm. Datum holes are located in the load beam such that during assembly all reference points are made from the single load beam piece.

28 Claims, 9 Drawing Sheets

TRANSDUCER SUSPENSION SYSTEM

BACKGROUND OF THE INVENTION

1. Field of the Invention

This invention relates generally to transducer suspension systems and more particularly to a transducer suspension system comprised of stacked material layers.

2. Description of Prior Art

Direct access storage devices (DASD), or disk drives, store information on concentric tracks of a rotatable magnetic recording disk. A magnetic head or transducer element is moved from track to track to record and read the desired information. Typically, the magnetic head is positioned on an air bearing slider which flies above the surface of the disk as the disk rotates. In some recently proposed disk drives, the slider (or carrier) rides on a liquid film or bearing on the disk. A suspension assembly connects the slider to a rotary or linear actuator. The suspension provides support for the slider.

As disk drives become smaller in size, the recorded track density has increased dramatically. This has necessitated the use of smaller and smaller heads and suspensions. However, the smaller geometries of the suspension and head make it more difficult to manufacture the disk drive. In particular it has become extremely difficult to manufacture these heads and suspension components and their related electrical lead lines with the required accuracy and small tolerances.

SUMMARY OF THE INVENTION

Briefly, in a preferred embodiment of the invention, a suspension system comprises a multiple layer flexure, a load beam, and an arm. The load beam extends from a tip of the suspension back to the rear of the arm member. The arm member is shaped to correspond to the shape of the rear portion of the load beam. The arm member is welded underneath the load beam. The load beam has a plurality of datum holes. By extending the load beam back and over the arm, all datum holes may be located in the load beam layer. These datum holes can be used not only for assembling all pieces of the suspension and attaching the slider, but also for subsequent actuator or head stack assembly. If only one piece has all of the datum points, then greater accuracy in the total manufacturing process is possible. All datum features may be located in the load beam with a size precision and precision to each other that is better than ±0.010 mm. Both the arm and flexure have larger holes than the corresponding holes on the load beam. Any alignment tooling pins, or actuator assembly parts which are inserted into the datum holes will contact the smaller holes of the load beam. Additional features of the present invention include merge tabs, electrostatic discharge grounding, and recessed portions for shearing parts from a frame.

For a fuller understanding of the nature and advantages of the present invention, reference should be made to the following detailed description taken in conjunction with the accompanying drawings.

DESCRIPTION OF THE PREFERRED EMBODIMENTS

Figure 1:
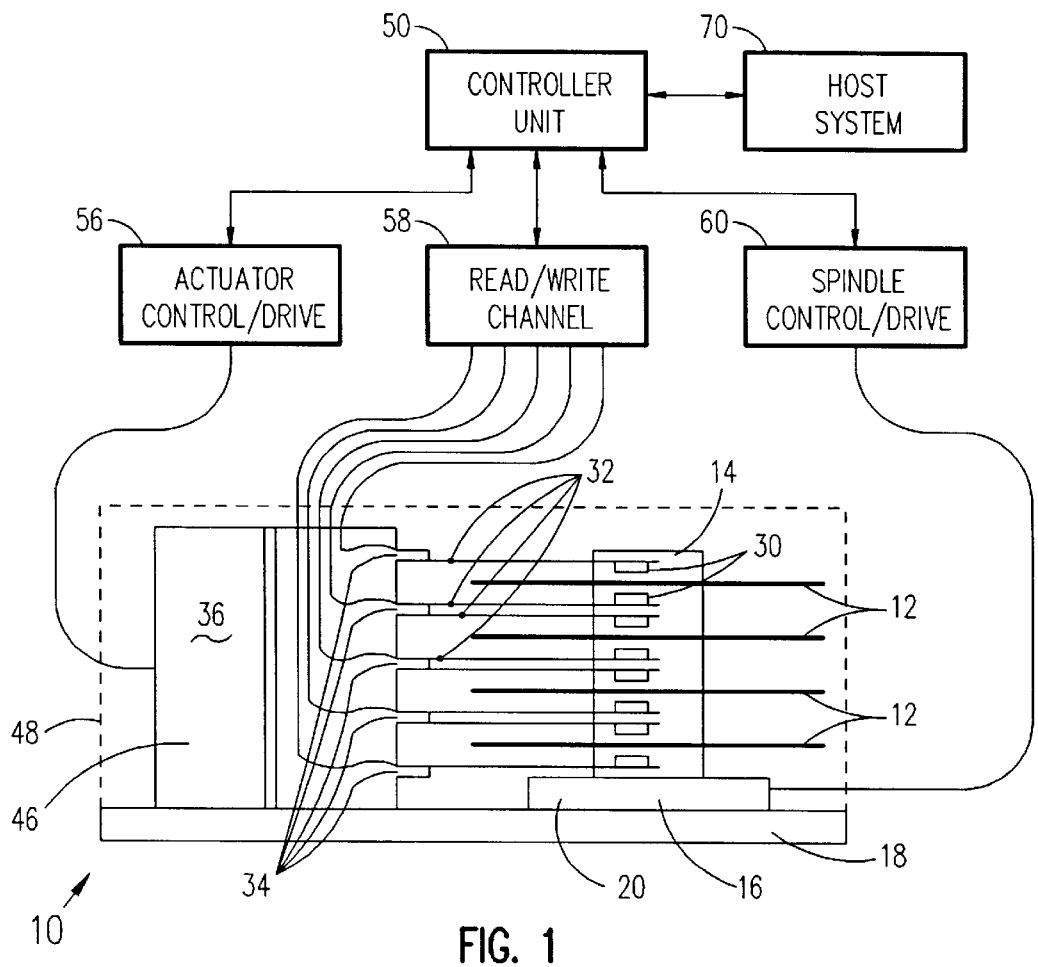
FIG. 1 is a schematic diagram of a data storage system of the present invention.
Figure 2:
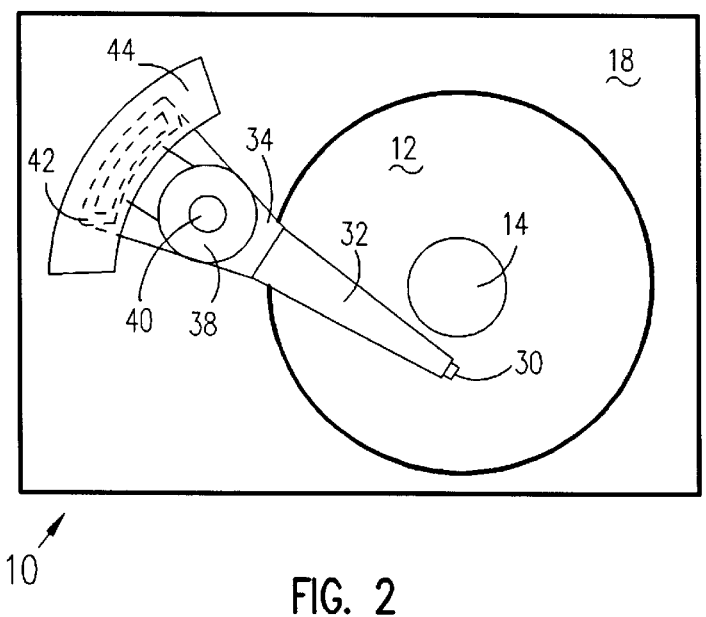
FIG. 2 is a top view of the system of FIG. 1.

FIGS. 1 and 2 show schematic diagrams of the data storage system of the present invention which is designated by the general reference number 10. System 10 comprises a plurality of magnetic recording disks 12. Each disk has a plurality of concentric data tracks. Disks 12 are mounted on a spindle motor shaft 14, which is connected to a spindle motor 16. Motor 16 is mounted to a chassis 18. The disks 12, spindle 14, and motor 16 comprise a disk stack assembly 20.

A plurality of read/write heads 30 are positioned over the disks 12 such that each surface of the disks 12 have a corresponding head 30. Each head 30 is attached to one of a plurality of suspensions 32 with it each suspension 32 has a corresponding actuator arm 34. Suspensions 32 are connected to a rotary actuator 36. Actuator 36 moves the heads in a radial direction across disks 12. Actuator 36 typically comprises a rotating member 38 mounted to a rotating bearing 40, a motor winding 42 and motor magnets 44. Actuator 36 is also mounted to chassis 18. The heads 30, suspension 32 and actuator 36 comprise an actuator assembly 46. The disk stack assembly 20 and the actuator assembly 46 are sealed in an enclosure 48 (shown by a dashed line) which provides protection from particulate contamination.

A controller unit 50 provides overall control to system 10. Controller unit 50 typically contains a central processing unit (CPU), memory unit and other digital circuitry. Controller 50 is connected to an actuator control/drive unit 56 which in turn is connected to actuator 36. This allows controller 50 to control the movement of heads 30 over disks 12. The controller 50 is connected to a read/write channel 58 which in turn is connected to the heads 30. This allows controller 50 to send and receive data from the disks 12.

Controller 50 is connected to a spindle control/drive unit 60 which in turn is connected to spindle motor 16. This allows controller 50 to control the rotation of disks 12. A host system 70, which is typically a computer system, is connected to the controller unit 50. System 70 may send digital data to controller 50 to be stored on disks 12, or may request the digital data be read from disks 12 and sent to the system 70. The basic operation of DASD units is well known in the art and is described in more detail in "Magnetic Recording Handbook", C. Dennis Mee and Eric D. Daniel, McGraw Hill Book Company, 1990.

Figure 3:
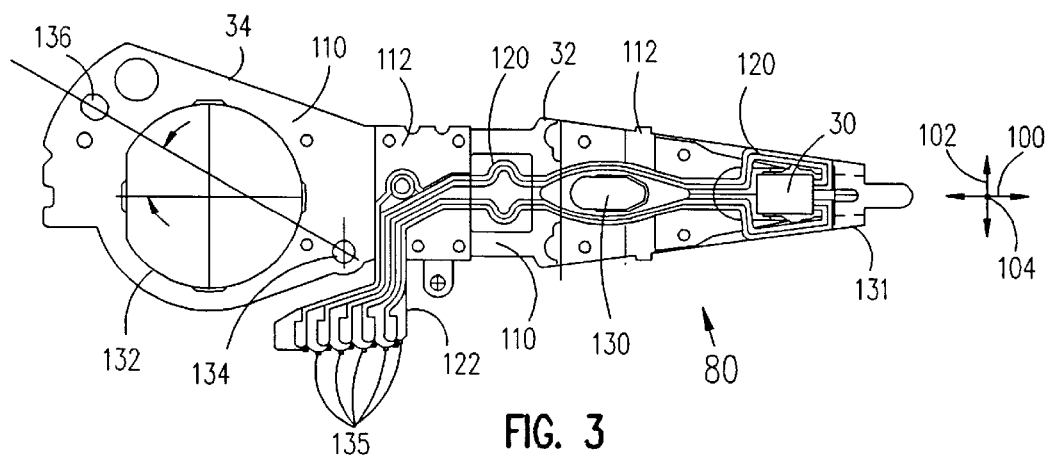
FIG. 3 is a detailed top view of a suspension system of FIG. 1 for an up facing head gimbal assembly.

FIG. 3 shows a top view of a head 30 attached to a suspension 32. This combination is referred to as a suspension assembly or head gimbal assembly (HGA) 80. In this case, the HGA is facing upward. Suspension 32 has a longitudinal axis 100, a lateral axis 102 and a vertical axis 104. Suspension 32 is comprised of a load beam 110, laminated flexure member 112, and an arm 34. Arm 34 is located underneath the rear portion of load beam 110. Laminated flexure member 112 is formed from a three-layer laminated material comprised of a steel support layer, electrically insulating layer, and electrically conductive layer. The various layers of the laminated member 112 are etched away in a photolithographic process to form the desired shapes.

The suspension 32 is extremely small. The distance from the rear of arm 34 to the end of the suspension is typically about 22 mm. The head 30 typically measures 1.25 mm×1.00 mm×0.30 mm. These dimensions vary according the particular disk drive system. In the future, these dimensions will probably be even smaller.

The electrically conducting layer and electrically insulating layer are etched to form electrical lines (or leads) 120 which run from the rear termination pad area 122 to the head 30. Head 30 is comprised of a slider and a magnetic read/write transducer element. The electrical lines 120 terminate and are electrically attached to the head at the head termination pads 131. The electrical lines 120 are bent vertically upward at the head termination pads 131.

Flexure member 112 provides a gimbal mount for attachment of the head 30. The gimbal mount allows the head 30 to pitch in order to adjust its orientation (static attitude) to achieve the proper air bearing between the head 30 and disks 12 while the disks 12 is rotating. The flying height of the head 30 varies from near contact to 100 nm depending upon the design, but typically during operation is 15 nm or less height above the disk. Proper alignment of the head 30 on the gimbal mount is critical.

Figure 4:
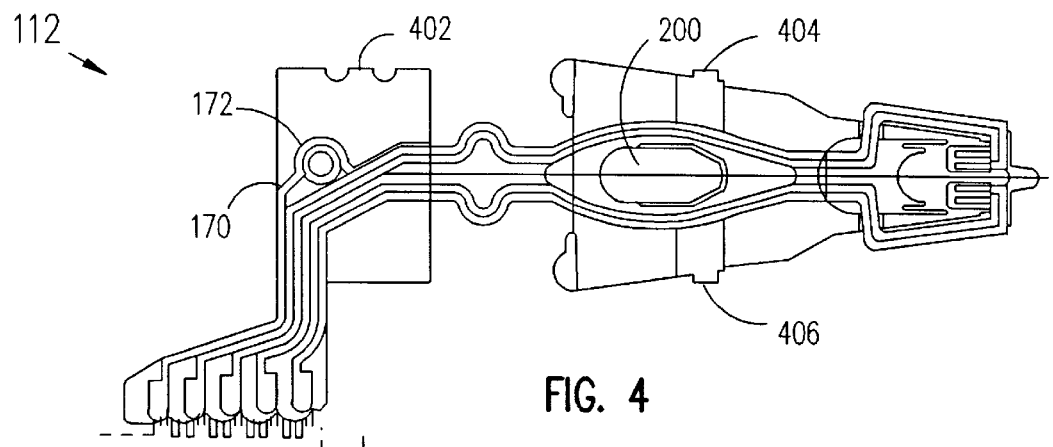
FIG. 4 is a top view of a flexure member.

The electrical lines 120 are designed to run along the same surface containing the head 30 and to run within the outer edges of the load beam 110, and close to the gimbal area around the head 30. In this configuration, the electrical lines 120 will be protected against inadvertent damage during handling. FIG. 4 shows a top view of the flexure member 112.

Figure 5:
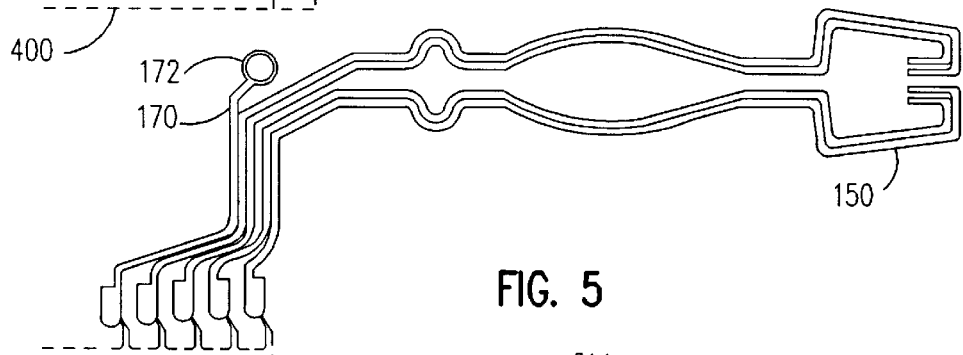
FIG. 5 is a top view of a conducting layer of the flexure member.
Figure 6:
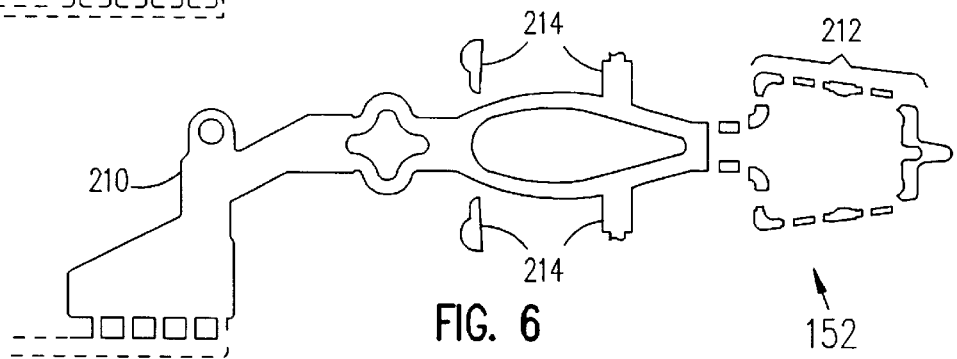
FIG. 6 is a top view of an insulating layer of the flexure member.
Figure 7:
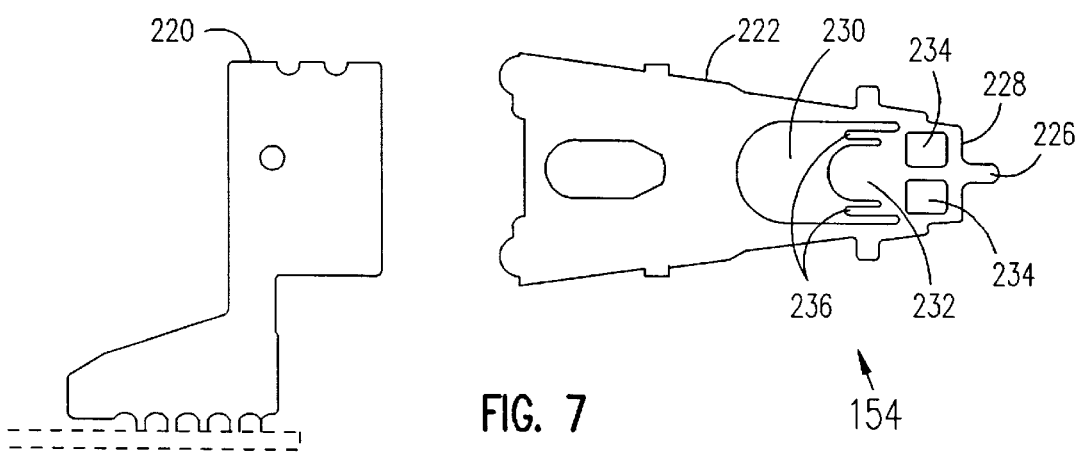
FIG. 7 is a top view of a support layer of the flexure member.

FIGS. 5–7 show top views of the various overlying element layers of flexure 112. FIGS. 5–7 show respectively, the electrically conducting layer 150, the electrically insulating layer 152, and the support layer 154 of the laminated member 112. Initially, the layers 150, 152, 154 are layers in a single laminated sheet of material. The member 112 is then formed from the sheet by using photolithographic etch processes as are known in the art. Layer 150 is made of a conducting material such as copper. In a preferred embodiment, the material is a high strength copper alloy and has a thickness of between 2 microns and 25 microns and preferably 18 microns. Layer 152 is made of an electrically insulating material and in a preferred embodiment is made of polyimide or Teflon and has a thickness of between 5 and 25 microns and preferably 18 microns. Layer 154 is made of a thin stiff material which is able to bend slightly, and in a preferred embodiment is made of stainless steel and has a thickness of between 12 and 30 microns and preferably 20 microns.

Referring now to FIG. 5. The electrical lines 120 comprise five separate lines. In a preferred embodiment, two of the lines run to the inductive element in the head 30 which is used to write data and two of the lines 120 run to the magnetoresistive element in the head 30 which is used to read data. The fifth line is used to provide an electrical connection path (typically of ground reference potential) to the support layer 154 of the flexure 112 and the load beam 110. Each of the lines has a thin rectangular cross section having a relatively large surface area on the top and bottom surfaces and relatively small surface area on the side surfaces. Lines 120 start from the termination pads 135 at area 122. The distal end of termination pads 135 provide connection to the read/write channel 58 through a flex cable. Solder bumps are produced on optimized pads 135 with enough volume to terminate to the flex cable pad. This eliminates the need and cost of positioning solder bumps on the flex cable pads. The distal ends 135 provide connection to the read/write channel 58. The lines 120 run from the side of the arm 34 towards the center longitudinal access 100 of the suspension 32. The lines 120 then run in a generally longitudinal direction toward the head 30. Line 170 terminates at the grounding node 172. The lines 120 may be plated with gold in order to protect against environmental corrosion of the copper conductors.

At the distal end of suspension 32, the four head lines 120 separate and run along either side of head 30, then turn backward toward the head 30 to terminate at the front face of head 30 at the head termination pads 131. This is necessary because the magnetic read/write transducer element is located on the front face of the slider. The lines 120 are bent 90° vertically in order to interface with pads 131.

FIG. 6 shows a top view of the electrically insulating layer 152. Layer 152 lies between layers 150 and 154. Layer 152 is shaped to provide electrical insulation protection to the lines 120 in layer 150 which directly overlay the layer 152. Layer 152 forms an insulating strip 210 directly beneath the lines 120. At the head area, layer 152 is shaped into a series of pads 212 which underlie lines 120. This is done to allow the lines 120 to be more flexible at the head area such that lines 120 do not interfere with movement of the head 30. Layer 152 also has a plurality of bumper pads 214 which are used to prevent metal contact with the disk during assembly and to prevent shock during operation.

FIG. 7 shows a top view of the support layer 154. Layer 154 has a rear portion 220 and a front portion 222. The front portion 222 has a distal end 226 having a front platform 228 which provides support for lines 120. Behind platform 228 is a flexure aperture 230. A tongue section 232 provides support and an attachment point for head 30. Between tongue section 232 and platform 228 are a pair of rectangular apertures 234. Apertures 234 allowed the lines 120 to bend as they approach the termination pads 131. A pair of tabs 236 extend from tongue section 232 and function as motion limiters when they are bent back under load beam 110.

Figure 8:
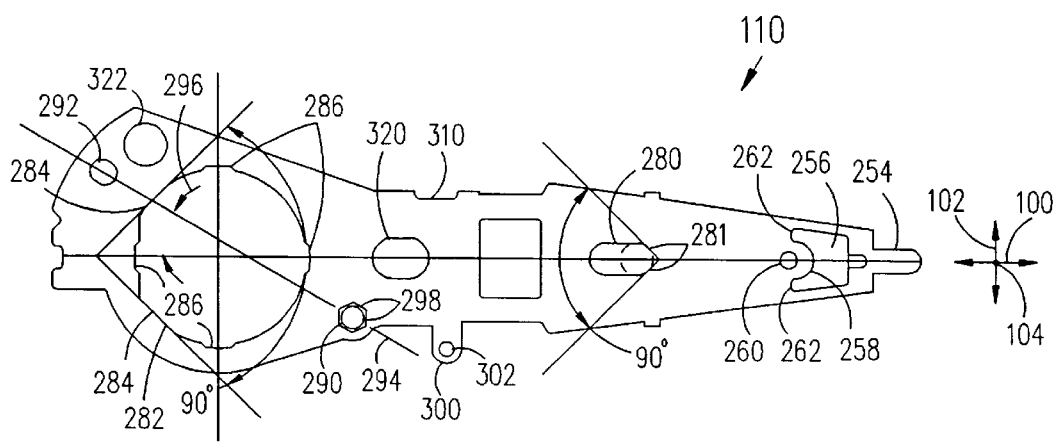
FIG. 8 is a top view of a load beam.

FIG. 8 shows a top view of load beam 110. Load beam 110 is generally flat and rigid and made of a stainless steel or other rigid material. In the preferred embodiment, the load beam 110 is stainless steel of about 0.025 to 0.075 mm thick and preferably 0.038 mm. It is desired to maintain the weight and inertia of the load beam as small as possible without compromising its structural rigidity.

Load beam 110 has a distal end with a tab 254 which is used for loading and unloading of the slider during operation of the disk drive. An aperture 256 is located behind tab 254. A tongue section 258 extends into aperture 256. A stamped raised button or dimple 260 is located on tongue 258. Dimple 260 contacts tongue section 232 of flexure member 112 and allows head 30 to gimbal (pitch and roll) slightly such that it allows the air bearing to follow the disk contour as it flies over the disk. A pair of corners 262 of aperture 256 provide a contact point for tabs 236 of flexure 154 such that tabs 236 pass under load beam 110 and provide a motion limiting function for the flexure member 154. Load beam 110 is also formed by a photolithographic process and the raised features are stamped.

The suspension 32 has a plurality of precision located apertures 130, 132, 134, and 136 in the load beam layer. As explained in more detail below, these apertures serve as datum features. Aperture 132 also serves to receive a shaft of the actuator 36. A plurality of suspensions 32 may be stacked unto the actuator shaft. However, the embodiments of this suspension are best realized in an actuator assembly of very small size and having just one pair of up and down facing suspensions.

Load beam 110 has an oval shaped aperture 280 located along the longitudinal axis 100 which corresponds to aperture 130 of suspension 32. Aperture 280 has two straight edges 281 located at its forward edge. Edges 281 are located 90° with respect to one another and are symmetrical with respect to longitudinal axis 100. A circular aperture 282 is located at the rear end of load beam 110 and is also located along axis 100. Aperture 282 corresponds to aperture 132 of suspension 32. Aperture 282 has two straight edges 284 located at its rear edge and four recess areas 286 equally located around its circumference. Edges 284 are located 90° with respect to one another and are symmetrical with respect to axis 100.

Load beam 110 has a pair of apertures 290 and 292 located on either side of aperture 282. Apertures 290 and 292 correspond to apertures 134 and 136 of suspension 32. Apertures 290 and 292 are located along a line 294 which passes thru aperture 282 and may or may not pass thru the center point of aperture 282. Line 294 is offset at an angle 296 relative to axis 100. Angle 296 is preferably in the range of +45° to -45° and is shown at about +30°. Aperture 290 can be circular but preferably it also has two straight edges 298 located at its forward edge. Edges 298 are located at 90° with respect to one another and are symmetrical with respect to an axis that is parallel to axis 100.

In this new miniature suspension, all of the critical datum apertures 280, 282, 290. 292 are concurrently formed in the single load beam layer 110 by etching to a tolerance better than +/-10 microns. All higher level assembly alignments are to these features in the load beam; including slider attached, suspension alignment on the carriage, and pivot cartridge alignment to the carriage/suspension assembly (HSA). In the suspension, all of the holes in the arm 34 and flexure 112 which correspond to apertures 280, 282, 290 and 292 are larger or recessed by a small amount (approx. 50 microns) from the corresponding boundary edges of the apertures in the load beam.

Aperture 282 which accepts a pivot carriage is not created as a totally round hole marginally larger than the pivot carriage, but has the 90° v-shaped edges 284 which oppose the opposing v-shaped edges 281 in aperture 280. In attaching the head 30 to the suspension 32, a tooling pin in aperture 280 is biased against the slider facing straight edges 281 by a movable tooling pin in aperture 282 that biases against the opposing straight edges 284. Thus, the accurate establishment and alignment of axis 100 of load beam 110 is firmly established by the cylindrical tooling pins resting against the edges 281 and 284.

Next consider the case of suspension alignment at the HSA level. In addition to the apertures 280 and 282, etched apertures 290 and 292 have been added. Apertures 290 and 292 are created with +/-10 microns tolerance accuracy. Apertures 290 and 292 both accept cylindrical tooling pins or cylindrical datum posts in the actuator carriage. Aperture 290 with its straight edges 298 is used to accurately locate load beam 110 in the plane comprised of axis 100 and 102. Aperture 292 acts as the rotational reference for establishing the suspension center line 100 with respect to the carriage coil and the appropriate carriage crash stop datum surface. This separation distance between apertures 290 and 292 may be relatively long because they are offset at angle 296 with respect to axis 100. Due to the shortage of space in the small suspension, it was not possible to locate them along the axis 100 and concurrently have them receive the corresponding datum features in the actuator carriage. These load beam features provide for self alignment of the suspensions to the carriage without the need for any additional datum tools in the stacking operation for the HSA. The special shape of aperture 282 in the load beam also provides a precise datum against which to bias the pivot cartridge so that the center of pivot rotation is accurately established with respect to the mass and center of gravity of the HGA.

Load beam 110 has a side tab 300 which has a through hole 302. This feature is used for merge and will be explained in more detail below. Load beam 110 has a side notch 310 located on the opposite side from tab 300.

Load beam 110 has a second oval aperture 320 located along axis 100 between aperture 280 and 282. Another circular aperture 322 is located at the rear near aperture 292 and provides access for a fastener to hold the HGAs to the actuator carriage before the pivot cartridge is installed.

Figure 9:
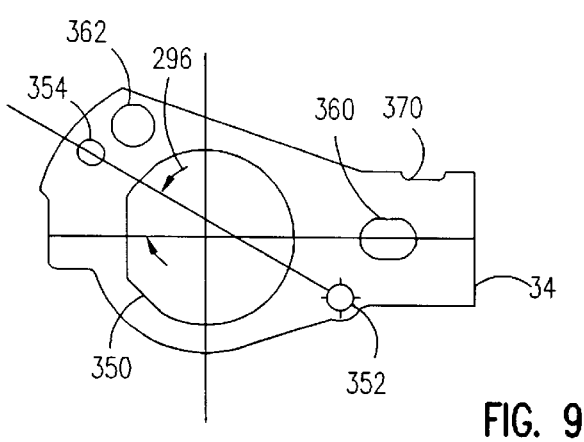
FIG. 9 is a top view of an arm member.

FIG. 9 shows a top view of arm 34. Arm 34 is typically made of stainless steel (preferably #305) material having a thickness of between 0.075 mm and 0.30 mm and preferably 0.15 mm. Arm 34 has apertures 350, 352 and 354 which correspond to apertures 282, 290 and 292, respectively, of load beam 110. Arm 34 also has apertures 360 and 362 which correspond to apertures 320 and 322 of load beam 110. Arm 34 also has a notch 370 in its side which corresponds to notch 310 of load beam 110.

The assembly process for the suspension 32 will now be explained. Initially, the flexure member 112 was fabricated from a thin layer laminated sheet by photolithographic etching as explained above. Preferably, multiple members 112 are made at the same time from a single sheet. The multiple members 112 are held to the frame (the remaining portion of the sheet) at four frame attached locations 400, 402, 404, 406. See FIG. 4.

Load beam 112 and arm 34 are welded together. To hold the two pieces together with proper alignment during welding, spring loaded tooling pins are placed through holes in the strip frame to which the load beam pieces are attached and datum holes 320 and 282 of load beam 110 and arm 34. All datum holes in load beam 110 are slightly smaller than the corresponding holes in the other pieces arm 34 or flexure 112. This insures that all datum points are measured from the load beam 110 during manufacture. This insures accuracy.

After beam 110 and arm 34 are welded together, they are placed under flexure 112. Spring loaded tooling pins are placed through apertures 130 and 132 to precisely position the pieces. The pieces are then welded together. In an alternative process, arm 34, load beam 110 and flexure 112 may be concurrently aligned and welded.

Figure 10:
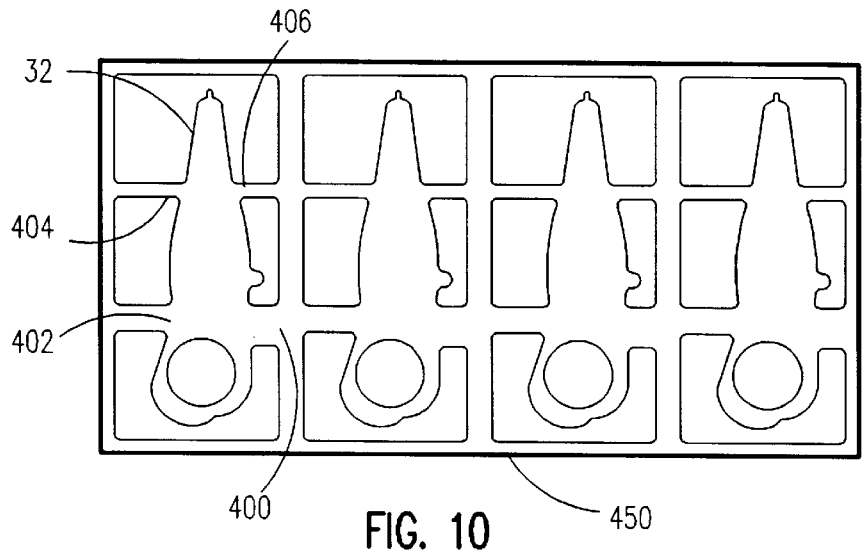
FIG. 10 is a top view of a suspension frame.

Once all the pieces (load beam 110, flexure 112 and arm 34) are welded together, they must be separated from the frame. As shown in FIG. 10, the suspension 32 is still held to a frame 450 by attachment points 400–406 of the flexure member 112.

A shearing tool is used to separate the attachment points 400–406. It is undesirable for attachment point 402 to leave any tab which protrudes beyond the side edge of suspension 32. This is because it may interfere with the outer perimeter of the disk stack during operation. Notches 310 and 370 in load beam 110 and arm 34, respectively, are located below attachment point 402 on flexure 112. These recesses 310 and 370 allow the shearing tool to cut inside the outer edge of suspension 32 and insure that no remaining portion of attachment point 402 extends beyond the edge.

Another difficulty in shearing occurs at attachment point 400. Attachment point 400 contains the termination pad area 122 where the electrical lines terminate. If the shear is not clean, the insulating layer 152 may tear, thereby allowing the conductor layer 150 to short with the support layer 154.

Figure 11:
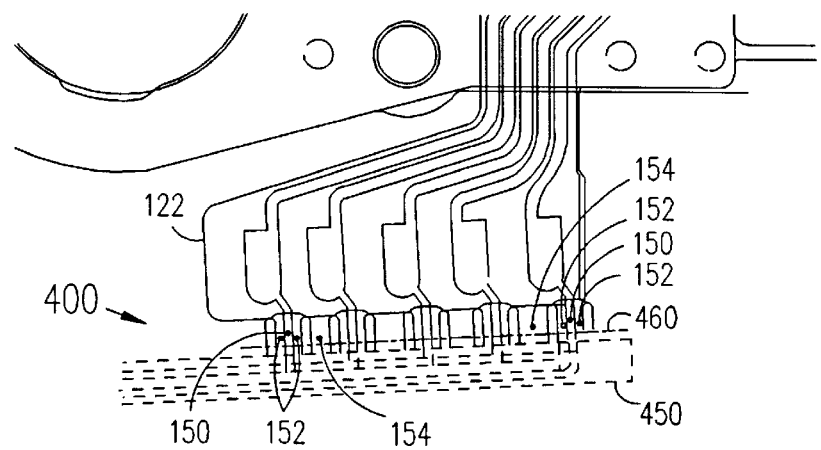
FIG. 11 is a top detailed view of a portion of FIG. 10.

FIG. 11 shows a top detailed view of attachment point 400. In order to prevent the shorting problem, the layers 150, 152, and 154 are staggered such that they do not overlie each other at the attachment point 400. The shearing tool cuts along a line 460 and independently cuts each tab of layers 150, 152, and 154. Since the layers 150, 152 and 154 do not overlie each other along the cut line 460, the possibility of inadvertent shorting is greatly reduced.

Figure 12:
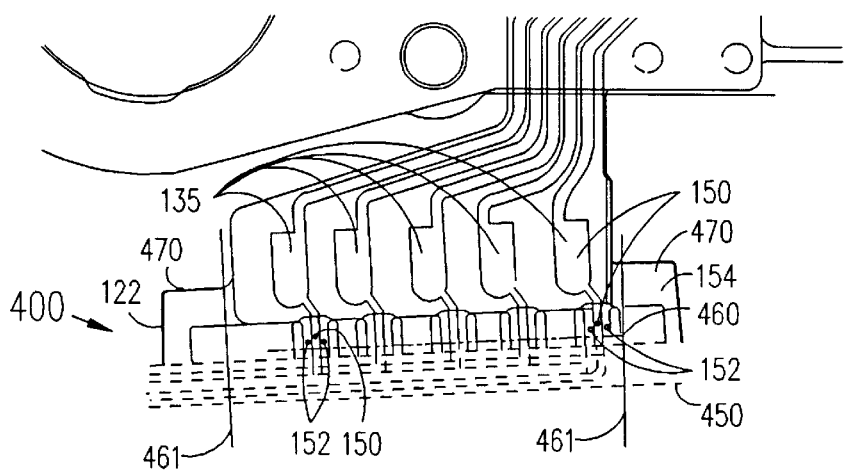
FIG. 12 is a top detailed view of an alternative embodiment of FIG. 10.

FIG. 12 shows an alternative embodiment of attachment 400. Here again, the layers 150, 152 and 154 had been staggered. Copper layer 150 from each of pads 135 runs between two strips of polyimide 152. Steel layer 154 now extends via a pair of arms 470 to frame 450. The shearing tool again cuts along line 460 and 461.

Once the suspension 32 has been removed from frame 450, it is ready for attachment of head 30. As explained above, the datum holes in load beam 110 are used to precisely position suspension 32 with respect to head 30. Head 30 is attached to tongue section 232 by adhesive. The four electrical head lines 120 are then ultrasonically bonded to head 30.

Figure 13:
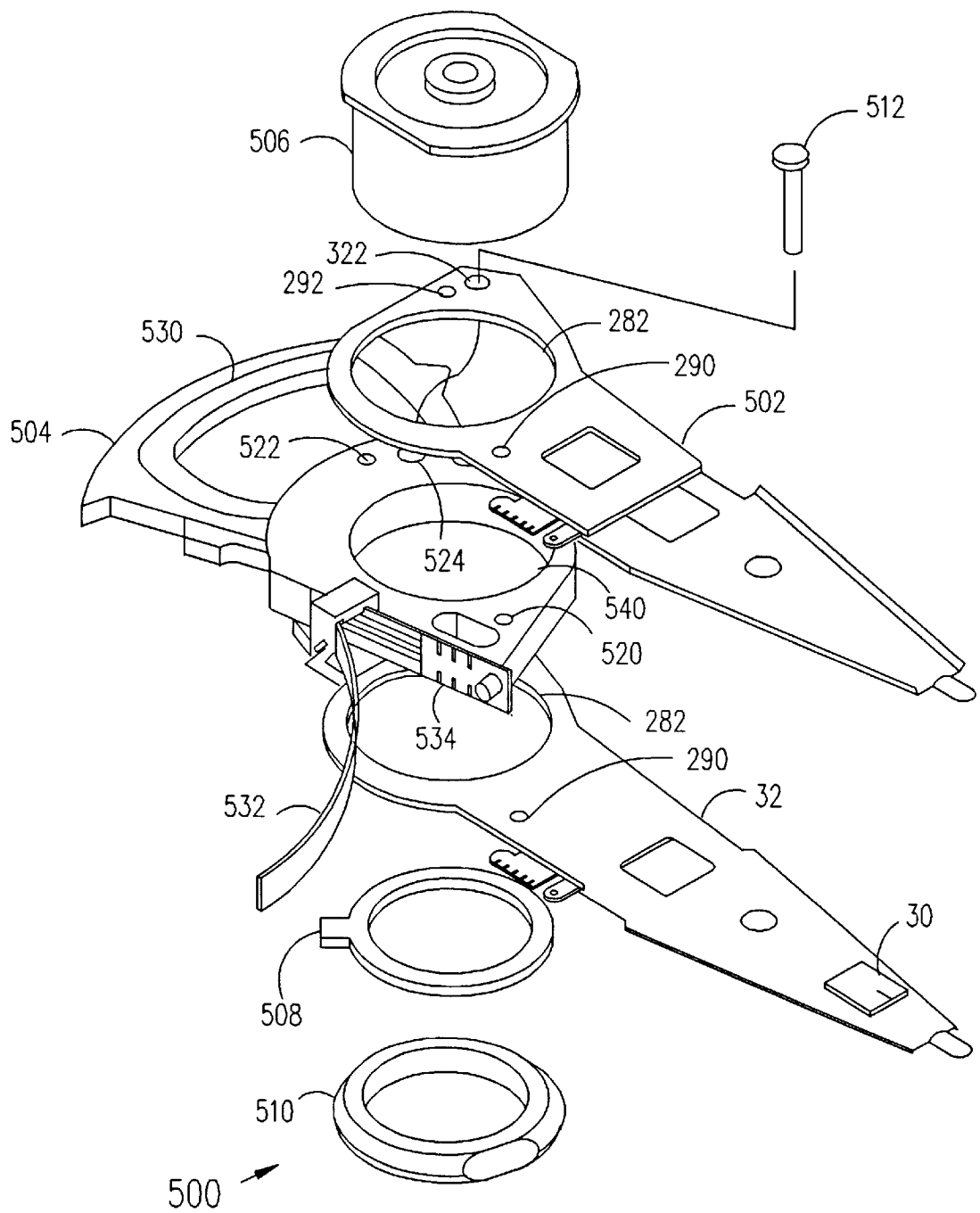
FIG. 13 is an exploded view of a head stack assembly.

FIG. 13 shows an exploded view of a head stack assembly which is designated by the general reference number of 500. HSA 500 comprises a suspension 32, an opposite facing suspension 502, a carriage 504, a cartridge bearing 506, a washer ring 508, a locking nut 510, and a fastener 512. Suspension 502 is similar to suspension 32 described above, with the exception that suspension 502 is a mirror image of suspension 32. Suspension 502 has a head 30 not shown, which will contact the top surface of a disk whereas suspension 32 has a head 30 which will contact the bottom portion of a disk. Carriage 504 has datum apertures 520 and 522, and aperture 524 which correspond to apertures 290, 292 and 322 of suspension 32. Carriage 504 also comprises an actuator coil 530 and a flex cable 532. Flex cable 532 has a plurality of electrical termination pads 534 which correspond to the pads 135 on suspensions 32 and 502.

During assembly, suspension 32, carriage 504, and suspension 502 are stacked together and a tooling pin is passed through hole 290 in the suspensions and hole 520 in the carriage, and a second tooling pin is passed through hole 292 in the suspension and hole 522 in the carriage. Alternatively, the apertures 520 and 522 in carriage 504 could be posts extending from the surface rather than apertures. These posts would then be inserted through apertures 290 and 292 of the load beams of the suspensions. Once the suspension datum holes 290 and 292 receive and align the carriage 504, a fastener shown as a pin 512 passes through holes 322 of the suspensions and holds the suspension assembly together for future processing. Alternatively, pin 512 may be omitted if the cartridge bearing 506, washer 508 and locking nut 510 have already been attached.

The apertures 290 and 292 of load beam 110 are slightly smaller than the corresponding apertures 352 and 354 of arm 34 and apparatus 520 and 522 of carriage 504. This means that the load beam is always used as the reference for the datum points.

Next, the electrical connection is made between the flex cable 532 and the suspensions 30 and 502. A solder reflow process is used to electrically connect the pads 534 to the corresponding pads 135 of the suspensions. Next, the carriage bearing 506 is inserted through apertures 282 of the suspension and an aperture 540 of the carriage. The spacer 508 and locking nut 510 are then attached to cartridge bearing 506 and locked in place.

Before removal of the head stack assembly from its manufacturing tooling and installation into the head disk assembly, it is necessary to insure that the heads 30 of suspensions 32 and 502 would be kept in a spaced relationship to one another in order to prevent damage to the delicate heads 30. A separation tool is used for such purpose. In the very miniature size head stack assemblies of the present invention, separator tools cannot be received and retained by the head stack assembly. The load beam tabs 300 solve this problem.

Figure 14:
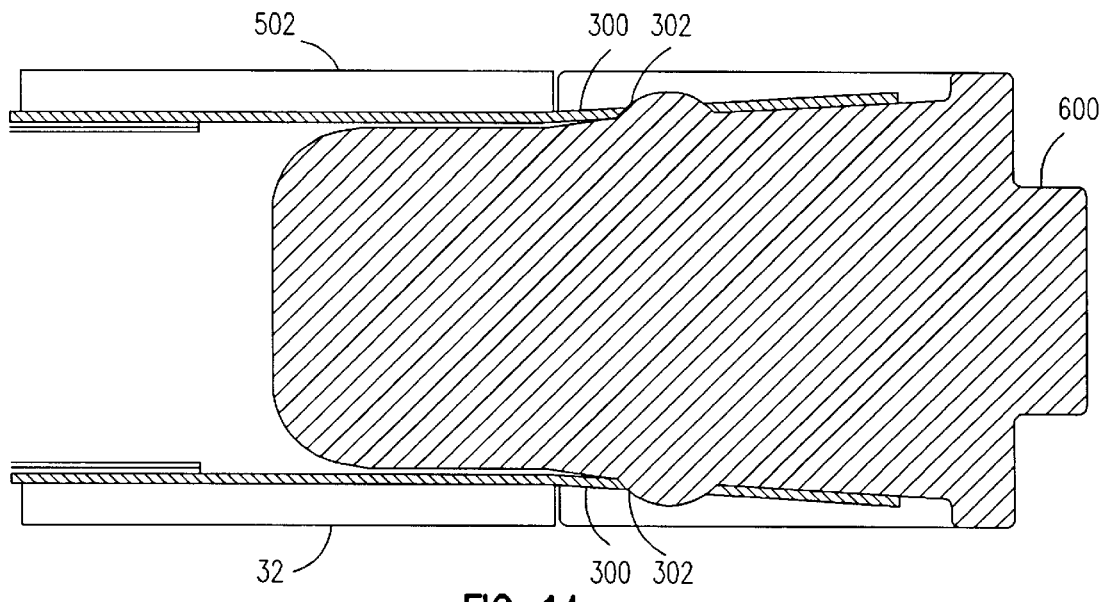
FIG. 14 is a side view of a pair of suspensions and a head separator tool.

FIG. 14 shows a side view of a pair of suspension 32 and a separator tool 600.

Figure 15:
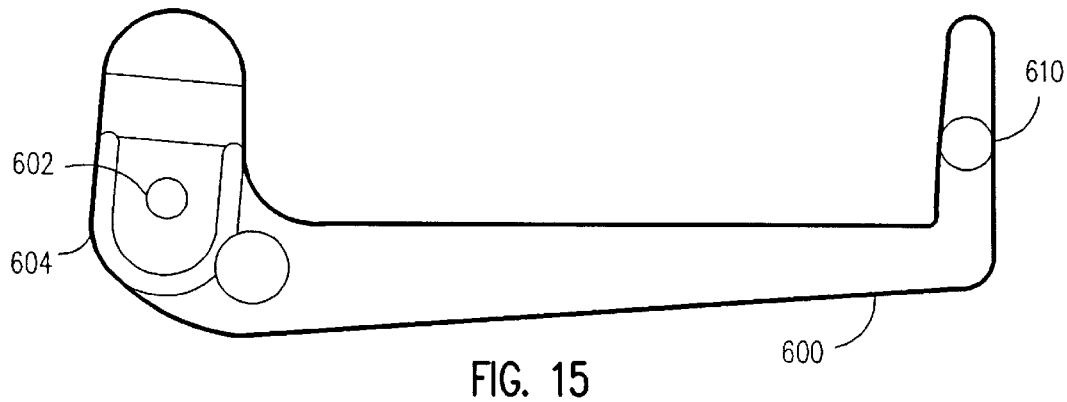
FIG. 15 is a top view of the head separator tool.
Figure 16:
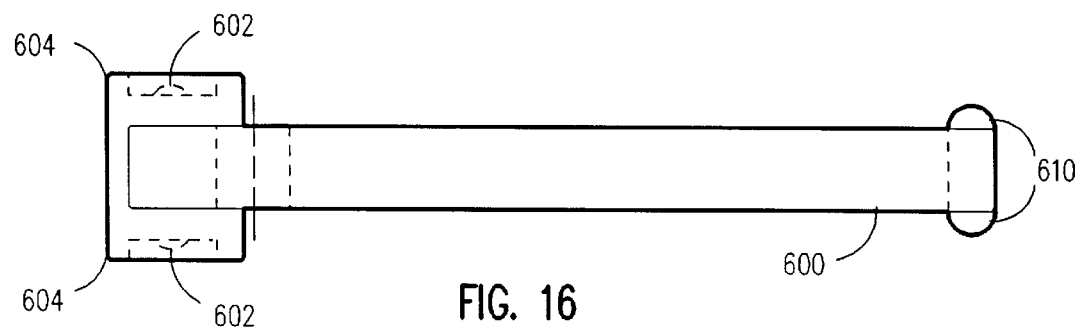
FIG. 16 is a side view of the head separator tool.

FIGS. 15 and 16 show top and side views, respectively, of separator tool 600. Separator tool 600 is made of a non conductive polymer material. Separator tool 600 has a pair of dimples 602 located on opposite sides of the separator tool 600. The dimples 602 are each located within a horseshoe shaped wall 604. In operation, tool 600 is placed such that dimples 602 engage hole 302 in tab 300 of the two suspensions 32 and 502. The wall 604 is shaped to receive tabs 302. As shown in FIG. 12, the tool 600 pushes tab 300 apart and is aligned and retained by tab 300 and hole 302, and a distal end 610 of the separator tool 600 pushes against the pair of load beams and hence heads 30, not shown, are spaced apart. This protects the heads 30 until they are ready to be inserted between the disks.

Figure 17:
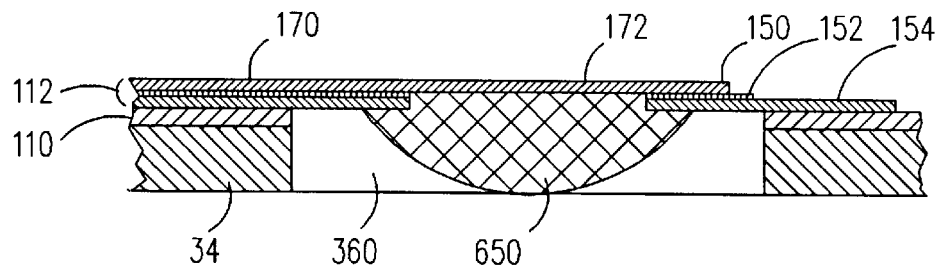
FIG. 17 is a side sectional view of the grounding node.

FIG. 17 shows a cross sectional view of a grounding node 172. Grounding line 170 is needed to electrically ground the support layer 154 of suspension 32. This is necessary to prevent buildup of electrical charge which may damage the delicate electronic components of head 30, or to ground reference the support layer under the conductors. In FIG. 17, line 170 is located over hole 360 of arm 34 and hole 320 of load beam 110. Support layer 154 and insulating layer 152 are etched away forming a hole beneath line 170. A drop of electrically conductive epoxy 550, such as Hysol Koizo is placed within the hole, thereby providing an electrical connection between the support layer 154 and the electrical line 170.

Figure 18:
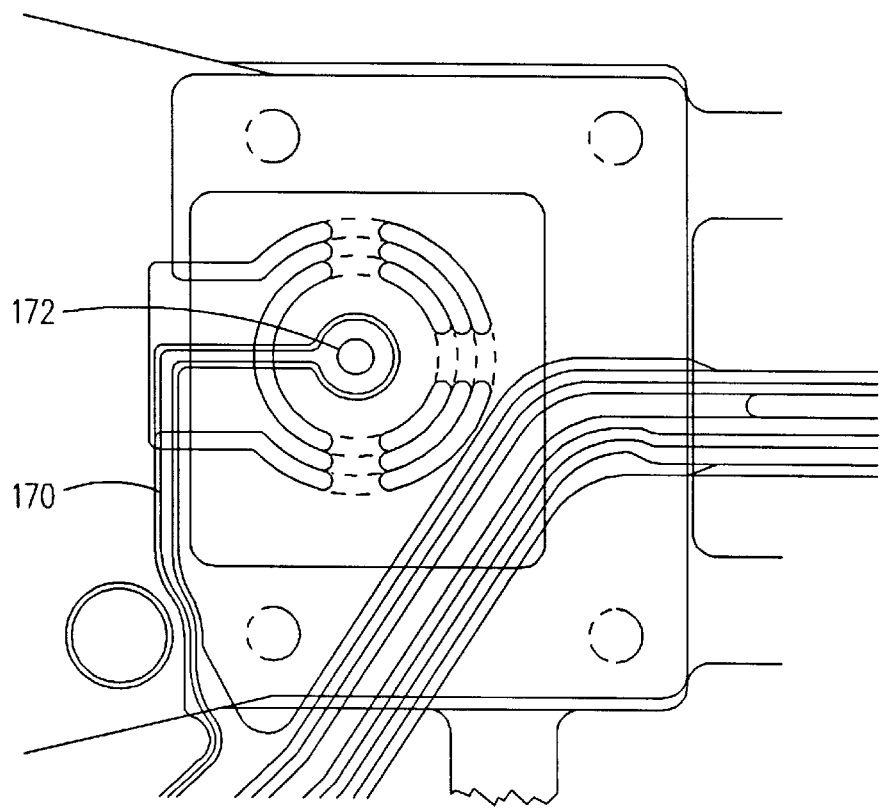
FIG. 18 is a top view of an alternative embodiment of the grounding node.
Figure 19:
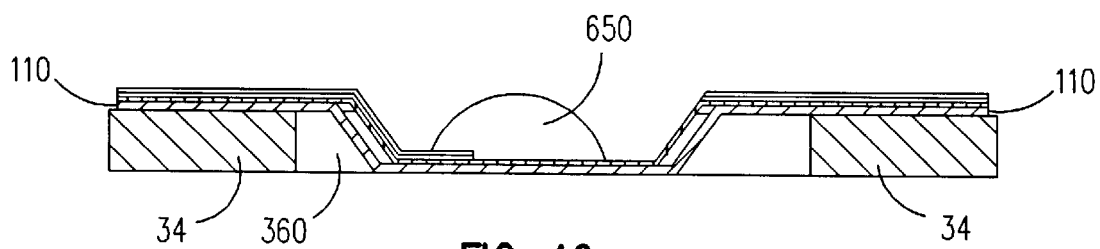
FIG. 19 is a side view of the grounding node of FIG. 18.

FIGS. 18 and 19 show top and side views of an alternative embodiment of the grounding node 172. The only difference is that the load beam 110 and flexure 112 have been bent into the hole 320.

Figure 20:
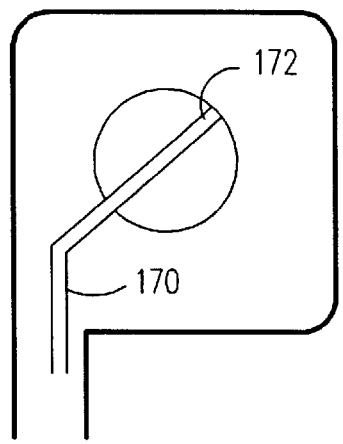
FIG. 20 is a top view of another embodiment of the grounding node.
Figure 21:
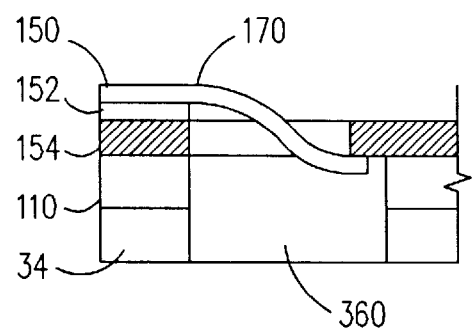
FIG. 21 is a side sectional view of the grounding node of FIG. 20.

FIGS. 20 and 21 show top and side views, respectively, of another embodiment of the grounding node 172. Instead of epoxy, line 170 is bent through hole 360 to contact support layer 154.

Figure 22:
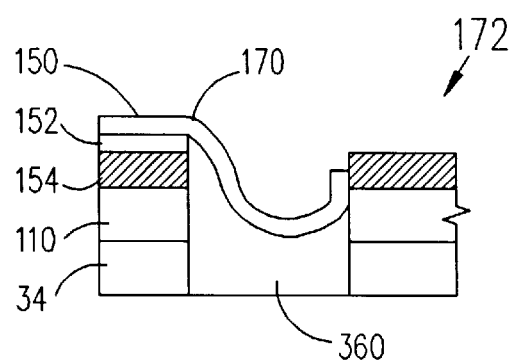
FIG. 22 is a side sectional view of another embodiment of the grounding node.

FIG. 22 shows a side view of another embodiment of the grounding node 172. Here the line 170 is bent through hole 320 and bent up against the other side of the hole to contact support layer 154.

Figure 23:
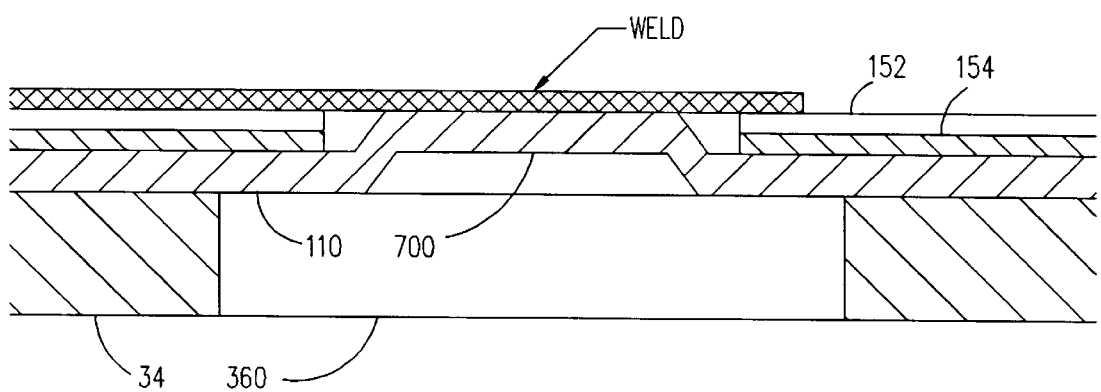
FIG. 23 is a side sectional view of another embodiment of the grounding node.

FIG. 23 shows a side view of another embodiment of the grounding node 172 that is similar to that shown in FIG. 17. The difference is that the load beam 120 has a slight bend with contacts grounding line 170 and the electrical connection is made by welding.

While the preferred embodiments of the present invention have been illustrated in detail, it should be apparent that modifications and adaptations to those embodiments may occur to one skilled in the art without departing from the scope of the present invention as set forth in the following claims.

We claim:

1. A transducer suspension system comprising:

a load beam member having a longitudinal axis, a lateral axis and a perpendicular axis, the load beam member having a first and a second ends, the first end having a first load beam aperture for attachment to an actuator, wherein the first load beam aperture has a pair of straight edges set at an angle with respect to one another and symmetrical about the longitudinal axis;

a flexure member overlying the load beam member, the flexure member comprised of an electrically conducting layer, an electrically insulating layer and support layer; and an arm member located underneath the load beam member at the first end of the load beam member, the arm member having a first arm aperture which corresponds to the first load beam aperture.

2. The system of claim 1, wherein the first arm aperture is larger than the corresponding first load beam aperture such that the inner edge of the first load beam aperture is located within the inner edge of the first arm aperture.

3. The system of claim 1, wherein the load beam has a second load beam aperture and the flexure member has a flexure aperture which corresponds to it.

4. The system of claim 3, wherein the flexure aperture is larger than the corresponding second load beam aperture.

5. The system of claim 3, wherein the second load beam aperture has two straight edges set at an angle with respect to one another and symmetrical about the longitudinal axis.

6. The system of claim 1, wherein the load beam has a pair of load beam datum apertures located on either side of load beam aperture and the arm has a pair of corresponding arm datum apertures.

7. The system of claim 6, wherein the pair of arm datum apertures are larger than the corresponding pair of load beam datum apertures.

8. The system of claim 6, wherein one of the pair of load beam datum apertures has a pair of straight edges set at an angle with respect to one another which are symmetrical with respect to the longitudinal axis.

9. The system of claim 1, wherein the load beam member has a fastener aperture and the arm member has a corresponding fastener aperture for receiving a fastener during the assembly process.

10. The system of claim 1, wherein the load beam member has a separation tab which extends from its side edge for engagement with a separation tool.

11. The system of claim 1, wherein the electrically conducting layer comprises a plurality of electrical lead lines and wherein one of the electrical lead lines is a ground line and is electrically connected to the support layer.

12. The system of claim 11, wherein the electrical connection between the ground line and the support layer is made by welding.

13. The system of claim 11, wherein the electrical connection between the ground line and the support layer comprises a conductive epoxy.

14. The system of claim 11, wherein the ground line is bent through an aperture in the insulating layer to contact the support layer.

15. The system of claim 1, wherein the flexure member has a plurality of shock bumpers comprised of the electrically insulating layer.

16. A transducer suspension system comprising:

a load beam member having a longitude axis, a lateral axis and a perpendicular axis, the load beam member having a first and a second ends, the first end having a first load beam aperture for attachment to an actuator;

a flexure member overlying the load beam member, the flexure member comprised of an electrically conducting layer, an electrically insulating layer and a support layer;

an arm member located underneath the load beam member at the first end of the load beam, the arm member having a first arm aperture which corresponds to the first load beam aperture;

wherein the load beam has a pair of load beam member datum apertures located on either side of the load beam member aperture, and the arm has a pair of corresponding arm datum apertures, one of the pair of load beam datum apertures has a pair of straight edges set at an angle with respect to one another which are symmetrical with respect to the longitudinal axis.

17. The system of claim 16, wherein the first arm aperture is larger than the corresponding first load beam aperture such that the inner edge of the first load beam aperture is located within the inner edge of the first arm aperture.

18. The system of claim 16, wherein the load beam number has a second load beam aperture and the flexure member has a flexure aperture which corresponds to it.

19. The system of claim 18, wherein the flexure aperture is larger than the corresponding second load beam aperture.

20. The system of claim 18, wherein the second load beam aperture has two straight edges set at an angle with respect to one another and symmetrical about the longitudinal axis.

21. The system of claim 16, wherein the pair of arm datum apertures are larger than the corresponding pair of load beam datum apertures.

22. The system of claim 16, wherein the load beam member has a fastener aperture and the arm member has a corresponding fastener aperture for receiving a fastener during the assembly process.

23. The system of claim 16, wherein the load beam member has a separation tab which extends from its side edge for engagement with a separation tool.

24. The system of claim 16, wherein the electrically conducting layer comprises a plurality of electrical lead lines wherein one of the electrical lead lines is a ground line and is electrically connected to the support layer.

25. The system of claim 24, wherein the electrical connection between the ground line and the support layer is made by welding.

26. The system of claim 24, wherein the electrical connection between the ground line and the support layer comprises a conductive epoxy.

27. The system of claim 24, wherein the ground line is bent through an aperture in the insulating layer to contact the support layer.

28. The system of claim 16, wherein the flexure member has a plurality of shock bumpers comprised of the electrically insulating layer.

* * * * *